United States Patent
Kanemitsu et al.

(10) Patent No.: US 8,861,887 B2
(45) Date of Patent: Oct. 14, 2014

(54) IMAGE PROCESSING APPARATUS, IMAGE PROCESSING METHOD, AND CAMERA MODULE WITH SHADING CORRECTION

(75) Inventors: Shiroshi Kanemitsu, Kanagawa (JP); Kazuhiro Tabuchi, Kanagawa (JP); Takaaki Kawakami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 284 days.

(21) Appl. No.: 13/187,948

(22) Filed: Jul. 21, 2011

(65) Prior Publication Data
US 2012/0114237 A1 May 10, 2012

(30) Foreign Application Priority Data

Nov. 4, 2010 (JP) ................................. 2010-247641

(51) Int. Cl.
| | | |
|---|---|---|
| G06K 9/40 | (2006.01) | |
| G09G 1/14 | (2006.01) | |
| G09G 3/28 | (2013.01) | |
| G09G 3/30 | (2006.01) | |
| G09G 5/00 | (2006.01) | |
| G09G 5/10 | (2006.01) | |
| H04N 5/228 | (2006.01) | |
| H04N 9/64 | (2006.01) | |
| H04N 5/202 | (2006.01) | |
| H04N 1/40 | (2006.01) | |
| H04N 5/357 | (2011.01) | |

(52) U.S. Cl.
CPC .................................. *H04N 5/3572* (2013.01)
USPC ................. 382/274; 345/20; 345/63; 345/77; 345/581; 345/690; 348/222.1; 348/251; 348/254; 358/461

(58) Field of Classification Search
None
See application file for complete search history.

(56) References Cited

U.S. PATENT DOCUMENTS

| | | | |
|---|---|---|---|
| 8,305,459 B2 * | 11/2012 | Kanemitsu et al. | 348/222.1 |
| 2003/0222998 A1 * | 12/2003 | Yamauchi et al. | 348/262 |
| 2010/0188497 A1 * | 7/2010 | Aizaki et al. | 348/79 |
| 2011/0069209 A1 * | 3/2011 | Kanemitsu et al. | 348/246 |
| 2011/0122273 A1 * | 5/2011 | Kanemitsu et al. | 348/222.1 |
| 2011/0298945 A1 * | 12/2011 | Chen et al. | 348/223.1 |
| 2012/0081580 A1 * | 4/2012 | Cote et al. | 348/231.99 |
| 2013/0286242 A1 * | 10/2013 | Cote et al. | 348/222.1 |

FOREIGN PATENT DOCUMENTS

| | | |
|---|---|---|
| JP | 2000-324505 | 11/2000 |
| JP | 2002-237998 | 8/2002 |
| JP | 2003-87653 | 3/2003 |
| JP | 2004-343358 | 12/2004 |
| JP | 2006-165894 A | 6/2006 |
| JP | 2008-53931 A | 3/2008 |
| JP | 2008053931 * | 3/2008 |

OTHER PUBLICATIONS

Office Action issued Sep. 10, 2013 in Japanese Patent Application No. 2010-247641 (with English-language translation).
Office Action mailed May 13, 2014, in Japanese Patent Application No. 2010-247641 (w/English translation), (6 pages).

* cited by examiner

*Primary Examiner* — Randolph I Chu
(74) *Attorney, Agent, or Firm* — Oblon, Spivak, McClelland, Maier & Neustadt, L.L.P.

(57) ABSTRACT

According to one embodiment, an image processing apparatus includes a shading correction unit. The shading correction unit executes at least one of the use of shading correction parameters calculated in accordance with exposure information for capturing a subject image and the adjustment of a center position in a two-dimensional direction which is used as the basis of the shading correction in accordance with the exposure information.

18 Claims, 8 Drawing Sheets

IMAGE PROCESSING APPARATUS, IMAGE PROCESSING METHOD, AND CAMERA MODULE WITH SHADING CORRECTION

CROSS-REFERENCE TO RELATED APPLICATIONS

This application is based upon and claims the benefit of priority from the prior Japanese Patent Application No. 2010-247641, filed on Nov. 4, 2010; the entire contents of all of which are incorporated herein by reference.

FIELD

Embodiments described herein relate generally to an image processing apparatus, an image processing method, and a camera module.

BACKGROUND

In regard to a camera module mounted in a recent mobile phone, focus is increasingly put on to promote low cost, small size, and reduction in thickness. In the camera module, a decrease in the light quantity of a peripheral portion of an image, partial coloring of an image or the like occurs depending on the optical performance of a lens. In regard to this phenomenon, the camera module performs image processing, such as shading correction or coloring correction. In recent years, many camera modules use a measure to increase the gain with respect to the output of an image sensor particularly in a low-illuminance environment as a countermeasure against degradation in sensitivity with the miniaturization of pixels.

In the image processing of the related art, predetermined luminance or color temperature is postulated, and adjustment corresponding to reduction in the light quantity of the peripheral portion or coloring is performed. As a method of adjustment, a method which uses a digital gain determined for each of a plurality of points of a screen or a digital gain determined by linear interpolation at a position between points, a method which uses a desired N-order function, and the like are known.

In the case of shading correction or coloring correction with predetermined luminance postulated, as the gain becomes larger in a low-illuminance environment, an adjustment error increases, and the precision of correction is lowered. In the case of shading correction aimed at low illuminance, an adjustment error due to the effect of a quantization error or the like increases in an environment which is brighter than the aimed illuminance. The imaging characteristic in the light-receiving surface of the image sensor changes depending on the wavelength of light, such that, when a color temperature varies, an error may occur in coloring correction.

DETAILED DESCRIPTION

In general, according to one embodiment, an image processing apparatus includes a shading correction unit. The shading correction unit performs shading correction of a subject image. The shading correction unit executes at least one of the use of parameters for shading correction calculated in accordance with exposure information for capturing the subject image at the time of shading correction and the adjustment of a center position in a two-dimensional direction as the basis of shading correction in accordance with exposure information.

Exemplary embodiments of an image processing apparatus, an image processing method, and a camera module will be explained below in detail with reference to the accompanying drawings. The present invention is not limited to the following embodiments.

Figure 1:
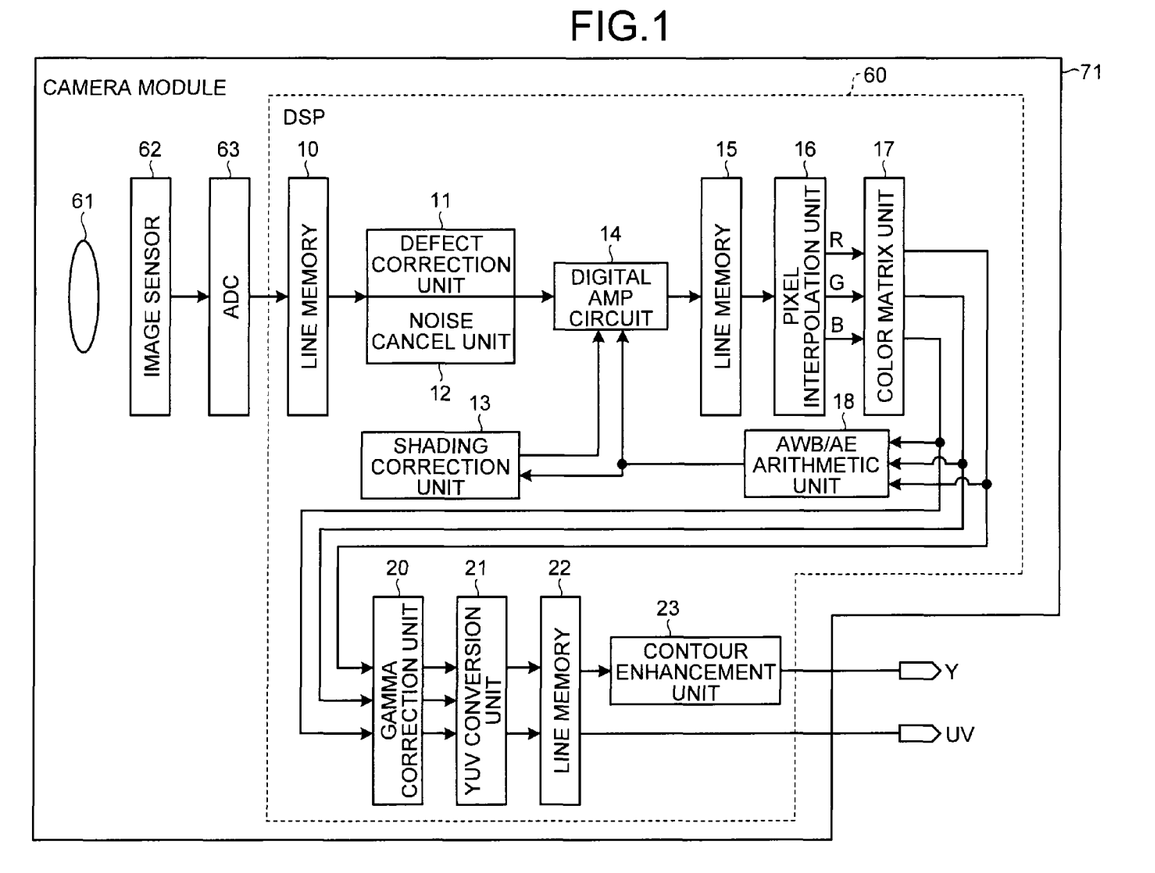
FIG. 1 is a block diagram of a camera module to which an image processing apparatus of a first embodiment is applied.
Figure 2:
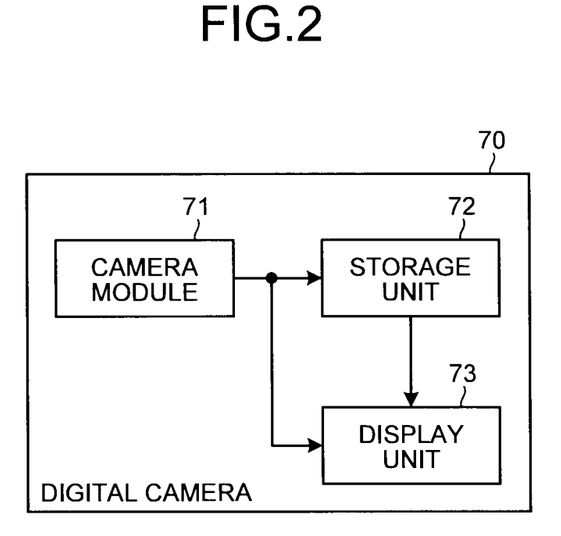
FIG. 2 is a block diagram illustrating the configuration of a digital camera which includes the camera module illustrated in FIG. 1.

FIG. 1 is a block diagram of a camera module to which an image processing apparatus of a first embodiment is applied. FIG. 2 is a block diagram illustrating the configuration of a digital camera which includes the camera module illustrated in FIG. 1.

A digital camera 70 includes a camera module 71, a storage unit 72, and a display unit 73. The camera module 71 captures a subject image. The storage unit 72 stores an image captured by the camera module 71. The display unit 73 displays an image captured by the camera module 71. The display unit 73 is, for example, a liquid crystal display.

The camera module 71 captures the subject image and outputs an image signal to the storage unit 72 and the display unit 73. The storage unit 72 outputs an image signal to the display unit 73 in accordance with a user's operation or the like. The display unit 73 displays an image in accordance with an image signal input from the camera module 71 or the storage unit 72.

The camera module 71 includes a lens unit 61, an image sensor 62, an analog-to-digital converter (ADC) 63, and a digital signal processor (DSP) 60.

The lens unit 61 introduces light from the subject image and forms the subject image in the image sensor 62. The image sensor 62 is a solid-state imaging device which converts light introduced by the lens unit 61 to signal charges and forms the subject image.

The image sensor 62 introduces the signal values of red (R), green (G), and blue (B) in order corresponding to the Bayer arrangement to generate an analog image signal. The ADC 63 converts the image signal from the image sensor 62 from an analog form to a digital form.

The DSP 60 serving as an image processing apparatus performs various kinds of image processing on the digital image signal from the ADC 63. A line memory 10 provided in the DSP 60 temporarily stores the digital image signal from the ADC 63.

A defect correction unit 11 performs defect correction on the digital image signal from the line memory 10. That is, the defect correction unit 11 corrects a lost portion (defect) of the digital image signal attributable to a malfunctioning pixel in the image sensor 62 A noise cancel unit 12 performs noise cancel processing for reducing noise. The defect correction unit 11 and the noise cancel unit 12 share the line memory 10.

The shading correction unit 13 calculates a correction amount for performing shading correction. An AWB/AE arithmetic unit 18 calculates a coefficient for adjusting auto white balance (AWB) and a coefficient for adjusting auto exposure (AE) from an RGB sensitivity signal.

A digital amplifier (AMP) circuit 14 calculates a digital AMP coefficient on the basis of the coefficients calculated by the AWB/AE arithmetic unit 18 and the correction amount calculated by the shading correction unit 13. The digital AMP circuit 14 multiples the digital image signal having passed through the defect correction unit 11 and the noise cancel unit 12 by the digital AMP coefficient.

A line memory 15 temporarily stores the digital image signal with the digital AMP coefficient multiplied. A pixel interpolation unit 16 performs interpolation processing (demosaic processing) on the digital image signal transferred from the line memory 15 in order of the Bayer arrangement to generate an RGB sensitivity signal. A color matrix unit 17 performs color matrix arithmetic processing (color reproducibility processing) on the RGB sensitivity signal so as to obtain color reproducibility.

A gamma correction unit 20 performs gamma correction on the RGB sensitivity signal so as to correct the gradation of the image. A YUV conversion unit 21 generates a luminance (Y) signal and a color difference (UV) signal from the RGB sensitivity signal to convert the image signal from an RGB format to a YUV format (for example, YUV 422 or the like). A line memory 22 temporarily stores the Y signal and the UV signal from the YUV conversion unit 21. A contour enhancement unit 23 performs contour enhancement processing on the Y signal from the line memory 22 using a correction coefficient calculated on the basis of the imaging condition in the image sensor 62 or the position of each pixel. The DSP 60 outputs the Y signal subjected to the contour enhancement processing in the contour enhancement unit 23 and the UV signal read from the line memory 22.

Figure 3:
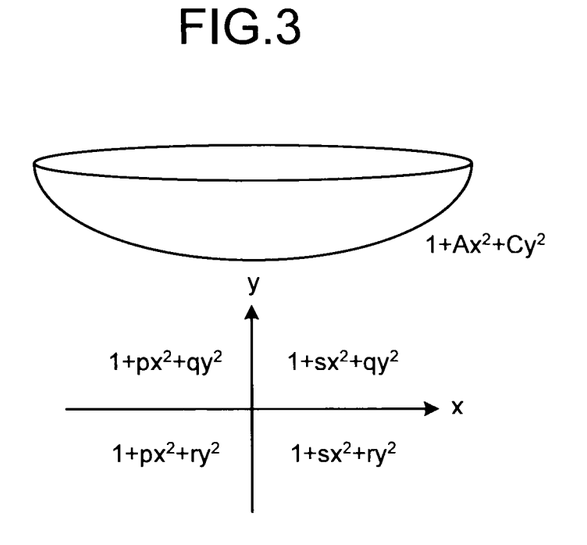
FIG. 3 is a diagram illustrating a method of shading correction by a shading correction unit.

FIG. 3 is a diagram illustrating a method of shading correction by the shading correction unit. The shading correction unit 13 performs shading correction using a quadratic function. It is assumed that a computational expression for calculating the correction amount by the shading correction unit 13 is $1+Ax^2+Cy^2$. This expression represents a paraboloid which is obtained by the rotation of a parabola. It is assumed that x represents a position in a horizontal direction (H direction), and y represents a position in a vertical direction (V direction).

It is assumed that parameters A and C which are parameters for shading correction are set for each quadrant divided by the x axis and the y axis. The parameters A and C are, for example, set to (A,C)=(s,q) in the first quadrant, (A,C)=(p,q) in the second quadrant, (A,C)=(p,r) in the third quadrant, and (A,C)=(s,r) in the fourth quadrant.

Figure 4:
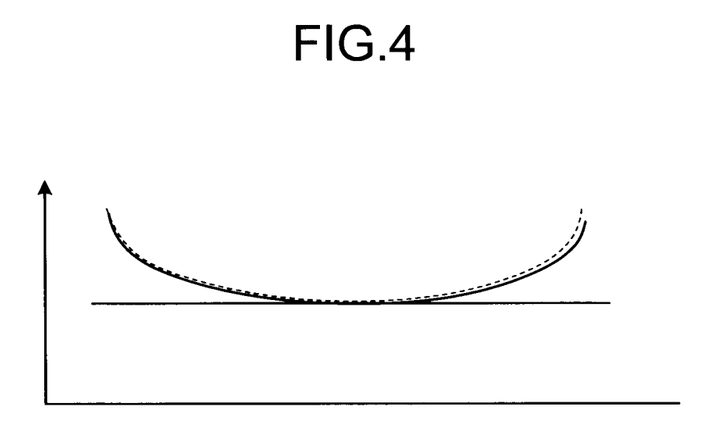
FIGS. 4 and 5 are diagrams illustrating the relationship between an error in a correction amount for shading correction and a gain.
Figure 5:
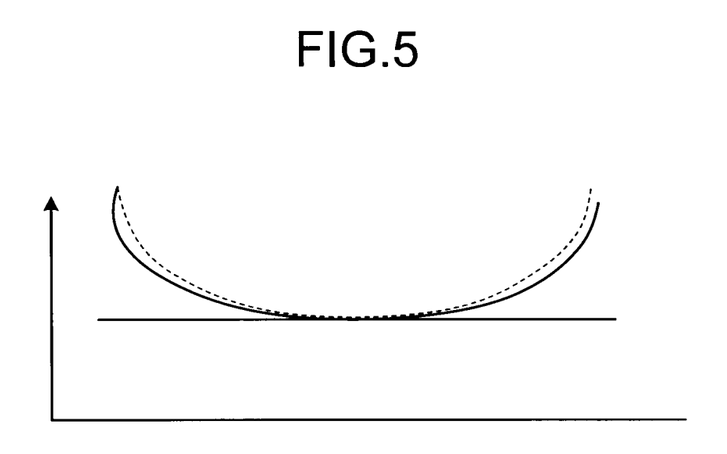

FIGS. 4 and 5 are diagrams illustrating the relationship between an error in the correction amount for shading correction and a gain. The correction amount obtained by computation is indicated by a solid-line curve, and the optical characteristic of the lens unit 61 is represented by a broken-line curve. The disparate amount between the correction amount obtained by computation and the optical characteristic of the lens unit 61 is doubled simultaneously with an increase in the magnification of the gain.

In the case of shading correction using fixed parameters which aimed at normal illuminance environment without depending on luminance, as the gain becomes larger in the low-illuminance environment, for example, an adjustment error increases from the state illustrated in FIG. 4 to the state illustrated in FIG. 5. In the case of shading correction aimed at low illuminance, in an environment which is brighter than the aimed illuminance, an adjustment error increases by the effect of a quantization error or the like.

Figure 6:
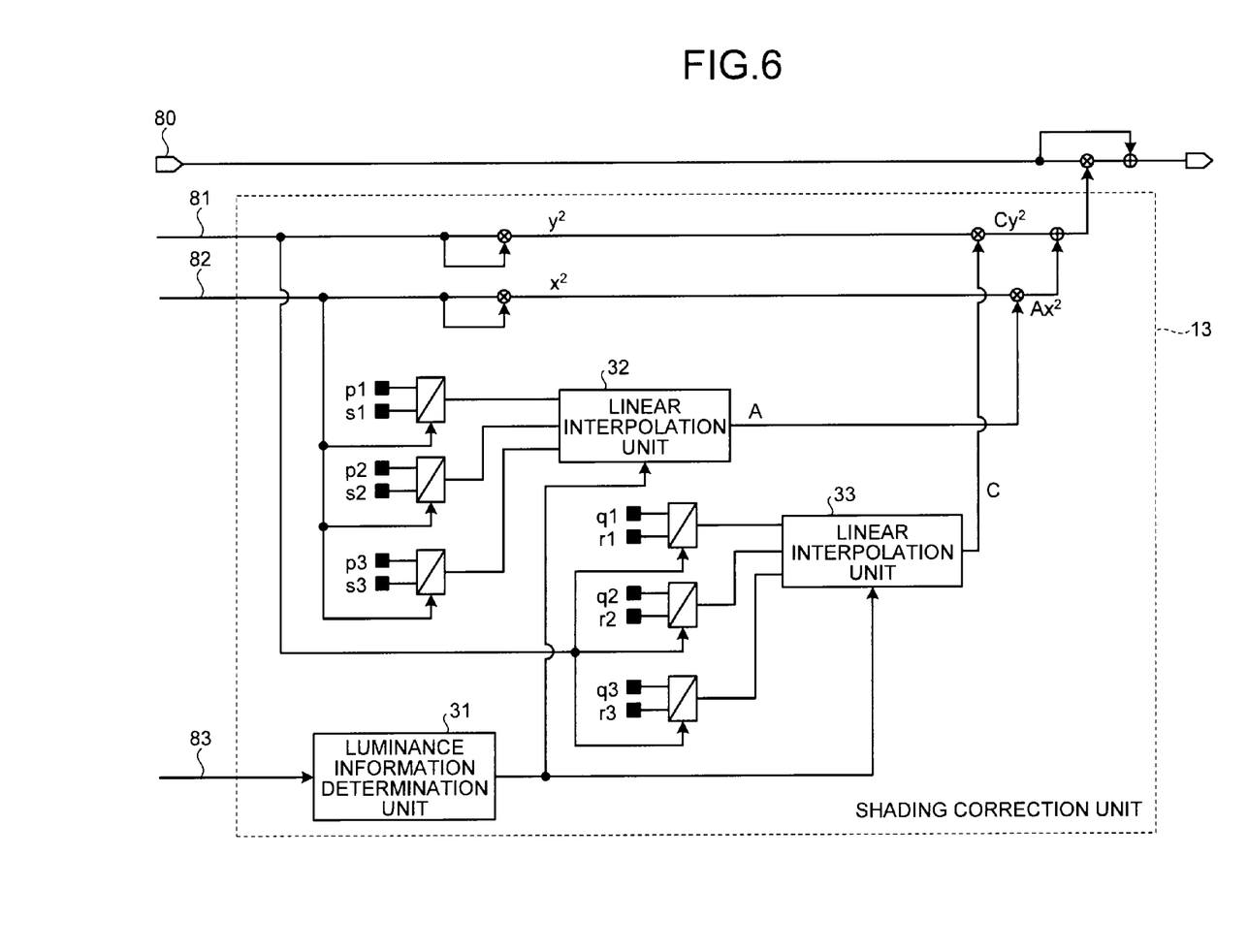
FIG. 6 is a block diagram illustrating the details of a shading correction unit.

FIG. 6 is a block diagram illustrating the details of the shading correction unit. A vertical synchronization signal 81, a horizontal synchronization signal 82, and AE information 83 are input to the shading correction unit 13. The AE information 83 refers to exposure information for capturing the subject image and is calculated by the AWB/AE arithmetic unit 18. A luminance information determination unit 31 determines luminance information of the subject image from the AE information 83.

The shading correction unit 13 holds the set values of the parameters for shading correction in each quadrant. For example, with regard to the parameter p, set values p1, p2, and p3 are set to correspond to three luminance levels 1, 2, and 3. With regard to the parameter q, set values q1, q2, and q3 are set to correspond to the three luminance levels 1, 2, and 3. With regard to the parameter r, set values r1, r2, and r3 are set to correspond to the three luminance levels 1, 2, and 3. With regard to the parameter s, set values s1, s2, and s3 are set to correspond to the three luminance levels 1, 2, and 3. The set values of the parameters p, q, r, and s are not limited to as being set to correspond to the three luminance levels, and may be set to correspond to a plurality of luminance levels.

The shading correction unit 13 identifies a quadrant in the H direction on the basis of the horizontal synchronization signal 82. Three selectors to which the horizontal synchronization signal 82 is input select one of the set values (p1, p2, and p3) of the parameter p and the set values (s1, s2, and s3) of the parameter s in accordance with the horizontal synchronization signal 82. A linear interpolation unit 32 appropriately selects outputs from the selectors in accordance with the luminance information from the luminance information determination unit 31 to perform linear interpolation processing.

For example, when the three selectors select the set values of the parameter p, it is assumed that a luminance level Y' determined by the luminance information determination unit 31 is between the luminance levels 1 and 2. When the luminance level Y' is normalized with the numerical values of 0 to 256, a linear interpolation expression is obtained as {(256−Y')×p1+Y'×p2}/256 using the set value p1 corresponding to the luminance level 1 and the set value p2 corresponding to the luminance level 2. A value A calculated by the linear interpolation unit 32 becomes the coefficient of $x^2$.

The shading correction unit 13 identifies a quadrant in the V direction on the basis of the vertical synchronization signal 81. Three selectors to which the vertical synchronization signal 81 is input select one of the set values (q1, q2, and q3) of the parameter q and the set values (s1, s2, and s3) of the parameter s in accordance with the vertical synchronization signal 81. A linear interpolation unit 33 appropriately selects outputs from the selectors in accordance with the luminance information from the luminance information determination unit 31 to perform linear interpolation processing in the same manner as in the linear interpolation unit 32. A value C calculated by the linear interpolation unit 33 becomes the coefficient of $y^2$.

As described above, the shading correction unit 13 performs interpolation processing on the set values held in advance in accordance with the luminance information to calculate the parameters for shading correction. The shading correction unit 13 adds $Ax^2$ and $Cy^2$ to calculate a correction amount. The correction amount calculated by the shading correction unit 13 is multiplied to the signal level of a RAW image 80. A value after multiplication is added to the signal level of the RAW image 80. With the above, the shading correction unit 13 performs shading correction using the parameters for shading correction calculated in accordance with the AE information 83.

With shading correction based on the AE information 83, the DSP 60 reduces the effect of a shading characteristic which differs depending on luminance and suppresses an increase in the adjustment error, regardless of the magnitude of the gain. Thus, the camera module 71 can obtain a high-quality image by shading correction with an adjustment error due to a variation in the gain reduced.

A modification of the first embodiment will be described. The shading correction unit 13 may determine color temperature information of the subject image and may adjust the parameters for shading correction in accordance with the color temperature information. In this case, the shading correction unit 13 may hold set values set in accordance with a plurality of color temperature levels in advance and may perform interpolation processing on the set values in accordance with the color temperature information to calculate a shading correction amount.

Figure 7:
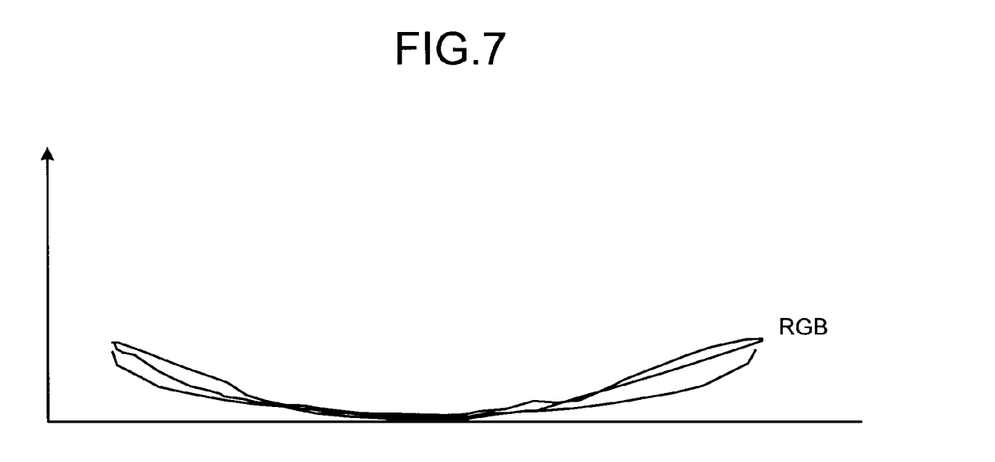
FIG. 7 is a diagram illustrating the occurrence of partial coloring in an image.

FIG. 7 is a diagram illustrating the occurrence of partial coloring in an image. Partial coloring occurs when the optical characteristic of the lens unit 61 differs between an R light component, a G light component, and a B light component. The imaging characteristic of the lens unit 61 in the light-receiving surface of the image sensor 62 changes depending on the wavelength of light. In the case of coloring correction with a predetermined color temperature postulated, a partial shift in the optical characteristic due to a variation in the color temperature may occur and become an adjustment error.

With coloring correction based on the AE information 83, the DSP 60 reduces the effect of the optical characteristic which differs depending on the color temperature and suppresses an increase in the adjustment error, regardless of the level of the color temperature. Thus, the camera module 71 can obtain a high-quality image by coloring correction with an adjustment error due to a variation in the color temperature reduced.

Figure 8:
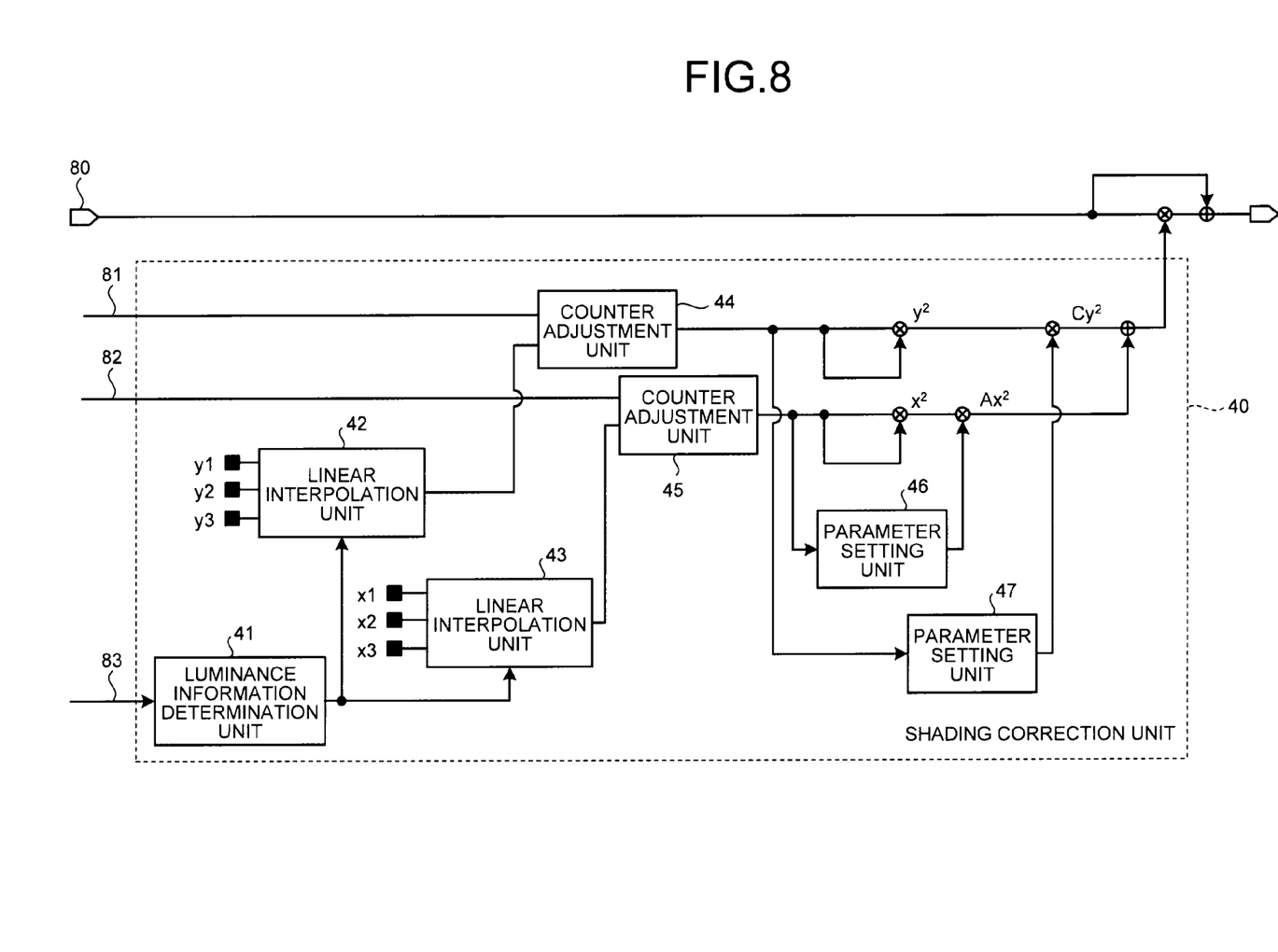
FIG. 8 is a block diagram of a shading correction unit which is applied to an image processing apparatus of a second embodiment.

FIG. 8 is a block diagram of a shading correction unit which is applied to an image processing apparatus of a second embodiment. A shading correction unit 40 adjusts a center position in a two-dimensional direction as the basis of shading correction in accordance with exposure information for capturing the subject image. The same parts as those in the first embodiment are represented by the same reference numerals, and a redundant description thereof will not be repeated.

Figure 9:
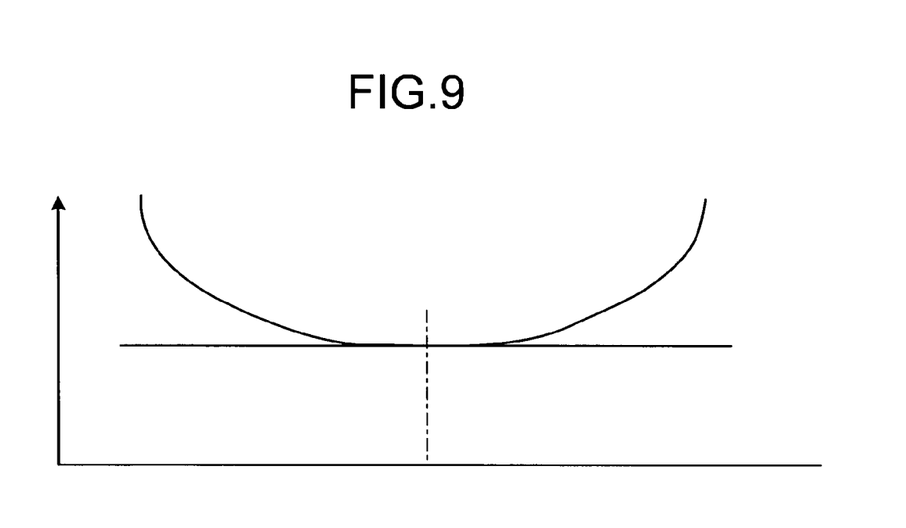
FIGS. 9 and 10 are diagrams illustrating the relationship between a center position of shading correction and a gain.
Figure 10:
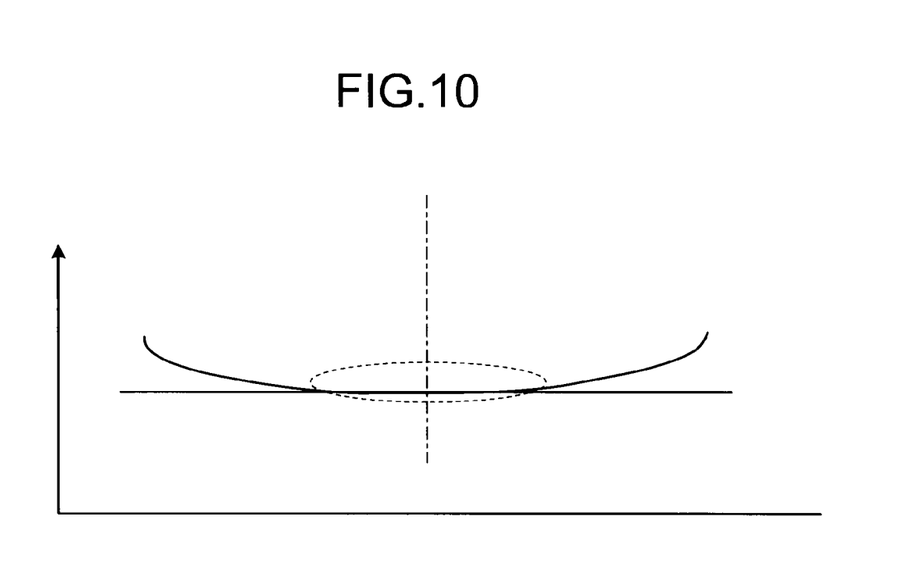

FIGS. 9 and 10 are diagrams illustrating the relationship between a center position of shading correction and a gain. As illustrated in FIG. 9, when a curve of correction amount has a certain level of curvature, the center position can be comparatively easily recognized. Meanwhile, as the gain changes and as illustrated in FIG. 10, the curvature of the curve of correction amount becomes smaller, it becomes difficult to recognize the center position, and a shift from the optical characteristic of the lens unit 61 easily occurs.

A luminance information determination unit 41 determines luminance information of the subject image from the AE information 83 as exposure information. The shading correction unit 40 holds the set values of x and y coordinates of the center position. For example, with regard to the x coordinate, set values x1, x2, and x3 are set to correspond to the three luminance levels 1, 2, and 3. With regard to the y coordinate, set values y1, y2, and y3 are set to correspond to the three luminance levels 1, 2, and 3. The set values of the x and y coordinates are not limited to as being set to correspond to the three luminance levels, and may be set to correspond to a plurality of luminance levels.

A linear interpolation unit 42 appropriately selects the set values y1, y2, and y3 in accordance with the luminance information from the luminance information determination unit 41 to perform linear interpolation processing. With the interpolation processing, the linear interpolation unit 42 calculates the y coordinate of the center position based on the luminance information. A linear interpolation unit 43 appropriately selects the set values x1, x2, and x3 in accordance with the luminance information from the luminance information determination unit 41 to perform linear interpolation processing. With the interpolation processing, the linear interpolation unit 43 calculates the x coordinate of the center position based on the luminance information.

A counter adjustment unit 44 adjusts the vertical synchronization signal 81 such that the center value of the number of effective pixels in the V direction becomes identical to the y coordinate calculated by the linear interpolation unit 42. A counter adjustment unit 45 adjusts the horizontal synchronization signal 82 such that the center value of the number of effective pixels in the H direction becomes identical to the x coordinate calculated by the linear interpolation unit 43.

A parameter setting unit 46 identifies a quadrant in the H direction on the basis of the horizontal synchronization signal 82 adjusted by the counter adjustment unit 45. A parameter setting unit 46 selects one of the parameter p and the parameter s in accordance with the identified quadrant. The parameter set by the parameter setting unit 46 is output as the value A and becomes the coefficient of $x^2$.

A parameter setting unit 47 identifies a quadrant in the V direction on the basis of the vertical synchronization signal 81 adjusted by the counter adjustment unit 44. A parameter setting unit 47 selects one of the parameter q and the parameter r in accordance with the identified quadrant. The parameter set by the parameter setting unit 47 is output as the value C and becomes the coefficient of $y^2$.

As described above, the shading correction unit 40 performs interpolation processing on the set values held in advance in accordance with the luminance information to determine the center position. The shading correction unit 40 adds $Ax^2$ and $Cy^2$ to calculate a correction amount. The correction amount calculated by the shading correction unit 40 is multiplied by the signal level of a RAW image 80. A value after the multiplication is added to the signal level of the RAW image 80. With the above, the shading correction unit 40 adjusts the center position in accordance with the AE information 83 and performs shading correction.

With the adjustment of the center position based on the AE information 83, the DSP 60 suppresses an adjustment error, regardless of the magnitude of the gain. Thus, the camera module 71 can obtain a high-quality image by shading correction with an adjustment error due to a variation in the gain reduced. The shading correction unit 40 may hold the set values set in accordance with a plurality of color temperature levels in advance and may perform interpolation processing on the set values in accordance with color temperature information to determine the center position.

Figure 11:
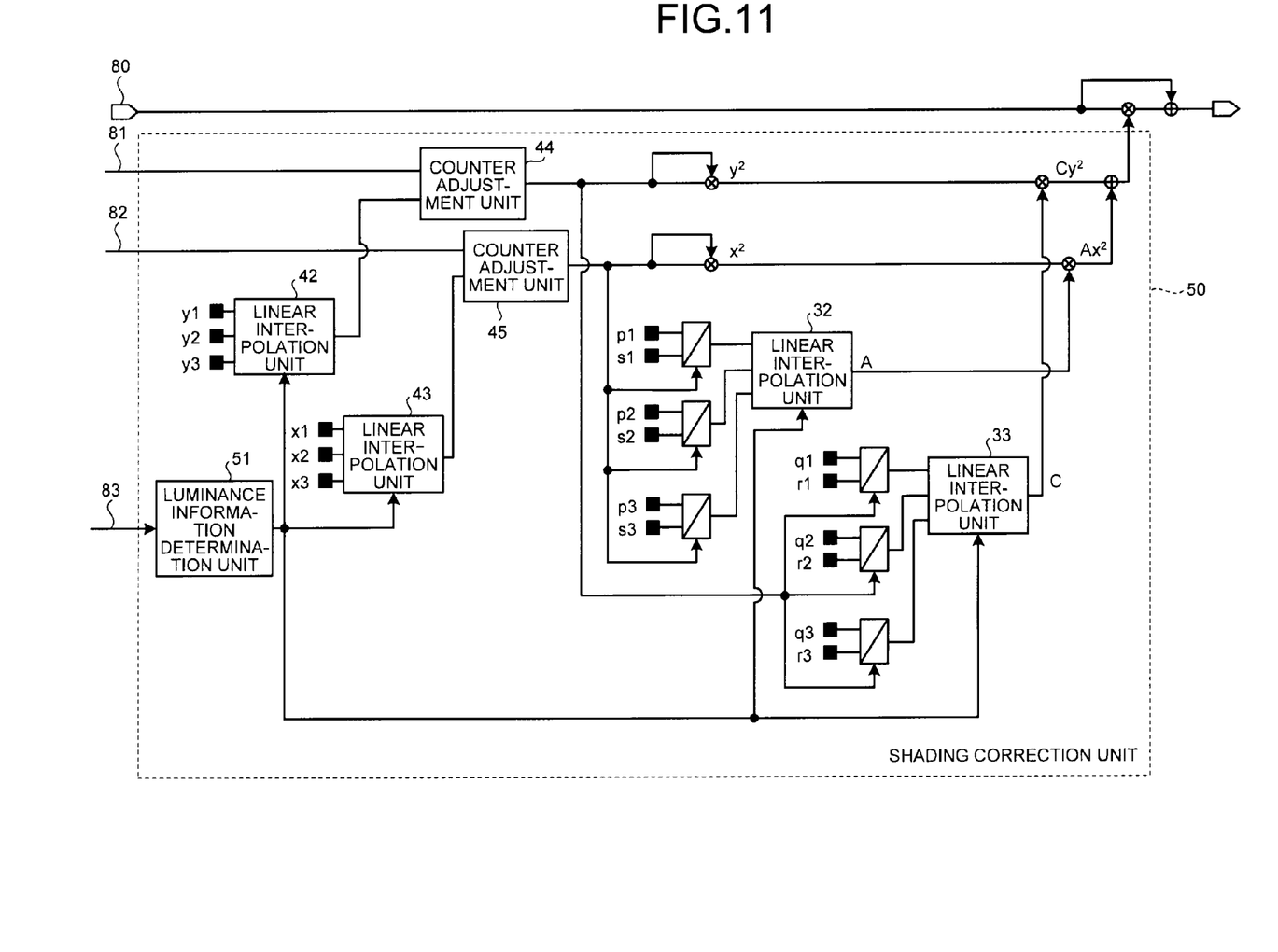
FIG. 11 is a block diagram of a shading correction unit which is applied to an image processing apparatus of a third embodiment.

FIG. 11 is a block diagram of a shading correction unit which is applied to an image processing apparatus of a third embodiment. A shading correction unit 50 of this embodiment includes both the constituent elements of the shading correction unit 13 of the first embodiment and the constituent elements of the shading correction unit 40 of the second embodiment. The same parts as those in the first and second embodiments are represented by the same reference numerals, and a redundant description will not be repeated.

The shading correction unit 50 holds the set values of x and y coordinates of the center position and the set values of the parameters for shading correction in each quadrant. A luminance information determination unit 51 determines luminance information of the subject image from the AE information 83 as exposure information. The linear interpolation unit 42 performs interpolation processing based on the luminance information from the luminance information determination unit 51 to calculate the y coordinate of the center position. The linear interpolation unit 43 performs interpolation processing based on the luminance information from the luminance information determination unit 51 to calculate the x coordinate of the center position.

Three selectors to which the horizontal synchronization signal 82 adjusted by the counter adjustment unit 45 is input identify a quadrant in the H direction in accordance with the horizontal synchronization signal 82 from the counter adjustment unit 45 and appropriately select one of the set values (p1, p2, and p3) of the parameter p and the set values (s1, s2, and s3) of the parameter s. The linear interpolation unit 32 appropriately selects outputs from the selectors in accordance with the luminance information from the luminance information determination unit 51 to perform linear interpolation processing.

Three selectors to which the vertical synchronization signal 81 adjusted by the counter adjustment unit 44 is input identify a quadrant in the V direction in accordance with the vertical synchronization signal 81 from the counter adjustment unit 44, and select one of the set values (q1, q2, q3) of the parameter q and the set values (r1, r2, and r3) of the parameter r. The linear interpolation unit 33 appropriately selects outputs from the selectors in accordance with the luminance information from the luminance information determination unit 51 to perform the linear interpolation processing.

With shading correction and adjustment of the center position based on the AE information 83, the DSP 60 reduces the effect of a shading characteristic which varies depending on luminance and suppresses an increase in the adjustment error, regardless of the magnitude of the gain. Thus, the camera module 71 can obtain a high-quality image by shading correction with an adjustment error, attributable to a variation in the gain, which is reduced.

The shading correction unit 50 may determine color temperature information of the subject image and may adjust at least one of the parameters for shading correction and the center position in accordance with color temperature information. With coloring correction based on the AE information 83, the DSP 60 reduces the effect of an optical characteristic which varies depending on the color temperature and suppresses an increase in the adjustment error, regardless of the level of the color temperature. Thus, the camera module 71 can obtain a high-quality image by coloring correction with an adjustment error, attributable to a variation in the color temperature, which is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a shading correction unit which calculates a correction amount for shading correction on a subject image;
    an auto white balance/auto exposure arithmetic unit which calculates a coefficient for auto white balance adjustment and a coefficient for auto exposure adjustment; and
    a digital amplifier coefficient circuit which calculates a digital amplifier coefficient on the basis of the coefficients calculated by the auto white balance/auto exposure arithmetic unit and the correction amount calculated by the shading correction unit, and multiplies the digital amplifier coefficient by an image signal obtained by capturing the subject image,
    wherein the shading correction unit executes at least one of use of shading correction parameters calculated in accordance with exposure information which is the coefficient for auto exposure adjustment in the calculation of the correction amount, and adjustment of a center position in a two-dimensional direction which is used as the basis of the shading correction in accordance with the exposure information.

2. The image processing apparatus according to claim 1, wherein the shading correction unit includes a luminance information determination unit which determines luminance information of the subject image from the exposure information, and calculates the shading correction parameters in accordance with the luminance information.

3. The image processing apparatus according to claim 2, wherein the shading correction unit performs interpolation processing on set values held in advance in accordance with the luminance information to calculate the shading correction parameters.

4. The image processing apparatus according to claim 1, wherein the shading correction unit includes a luminance information determination unit which determines luminance information of the subject image from the exposure information, and calculates coordinates of the center position in accordance with the luminance information.

5. The image processing apparatus according to claim 4, wherein the shading correction unit performs interpolation processing on set values held in advance in accordance with the luminance information to calculate the coordinates of the center position.

6. The image processing apparatus according to claim 1, wherein the shading correction unit determines color temperature information of the subject image, and adjusts at least one of the shading correction parameters and the center position in accordance with the color temperature information.

7. An image processing method comprising:
    calculating a correction amount for shading correction on a subject image;
    calculating a coefficient for auto white balance adjustment and a coefficient for auto exposure adjustment;
    calculating a digital amplifier coefficient on the basis of the coefficients and the correction amount; and multiplying the digital amplifier coefficient by an image signal obtained by capturing the subject image, wherein at least one out of use of shading correction parameters calculated in accordance with exposure information which is the coefficient for auto exposure adjustment in the calculation of the correction amount, and adjustment of a center position in a two-dimensional direction which is used as the basis of the shading correction in accordance with the exposure information is executed.

8. The image processing method according to claim 7, wherein, in the shading correction, luminance information of the subject image is determined from the exposure information, and the shading correction parameters are calculated in accordance with the luminance information.

9. The image processing method according to claim 8, wherein, in the shading correction, interpolation processing is performed on set values held in advance in accordance with the luminance information to calculate the shading correction parameters.

10. The image processing method according to claim 7, wherein, in the shading correction, luminance information of the subject image is determined from the exposure information, and coordinates of the center position are calculated in accordance with the luminance information.

11. The image processing method according to claim 10, wherein, in the shading correction, interpolation processing is performed on set values held in advance in accordance with the luminance information to calculate the coordinates of the center position.

12. The image processing method according to claim 7, wherein, in the shading correction, color temperature information of the subject image is determined, and at least one of the shading correction parameters and the center position is adjusted in accordance with the color temperature information.

13. A camera module comprising:

a lens unit which receives light from a subject;

an image sensor which generates an image signal based on light received by the lens unit; and an image processing apparatus which performs image processing on the image signal from the image sensor, wherein the image processing apparatus includes:

a shading correction unit which calculates a correction amount for shading correction of a subject image;

an auto white balance/auto exposure arithmetic unit which calculates a coefficient for auto white balance adjustment and a coefficient for auto exposure adjustment; and a digital amplifier coefficient circuit which calculates a digital amplifier coefficient on the basis of the coefficients calculated by the auto white balance/auto exposure arithmetic unit and the correction amount calculated by the shading correction unit, and multiplies the digital amplifier coefficient by an image signal obtained by capturing the subject image, the shading correction unit executes at least one out of use of shading correction parameters calculated in accordance with exposure information which is the coefficient for auto exposure adjustment in the calculation of the correction amount, and adjustment of a center position in a two-dimensional direction which is used as the basis of the shading correction in accordance with the exposure information.

14. The camera module according to claim 13, wherein the shading correction unit includes a luminance information determination unit which determines luminance information of the subject image from the exposure information, and calculates the shading correction parameters for shading correction in accordance with the luminance information.

15. The camera module according to claim 14, wherein the shading correction unit performs interpolation processing on set values held in advance in accordance with the luminance information to calculate the shading correction parameters.

16. The camera module according to claim 13, wherein the shading correction unit includes a luminance information determination unit which determines luminance information of the subject image from the exposure information, and calculates coordinates of the center position in accordance with the luminance information.

17. The camera module according to claim 16, wherein the shading correction unit performs interpolation processing on set values held in advance in accordance with the luminance information to calculate the coordinates of the center position.

18. The camera module according to claim 13, wherein the shading correction unit determines color temperature information of the subject image, and adjusts at least one of the shading correction parameters and the center position in accordance with the color temperature information.

* * * * *